Figure 1:
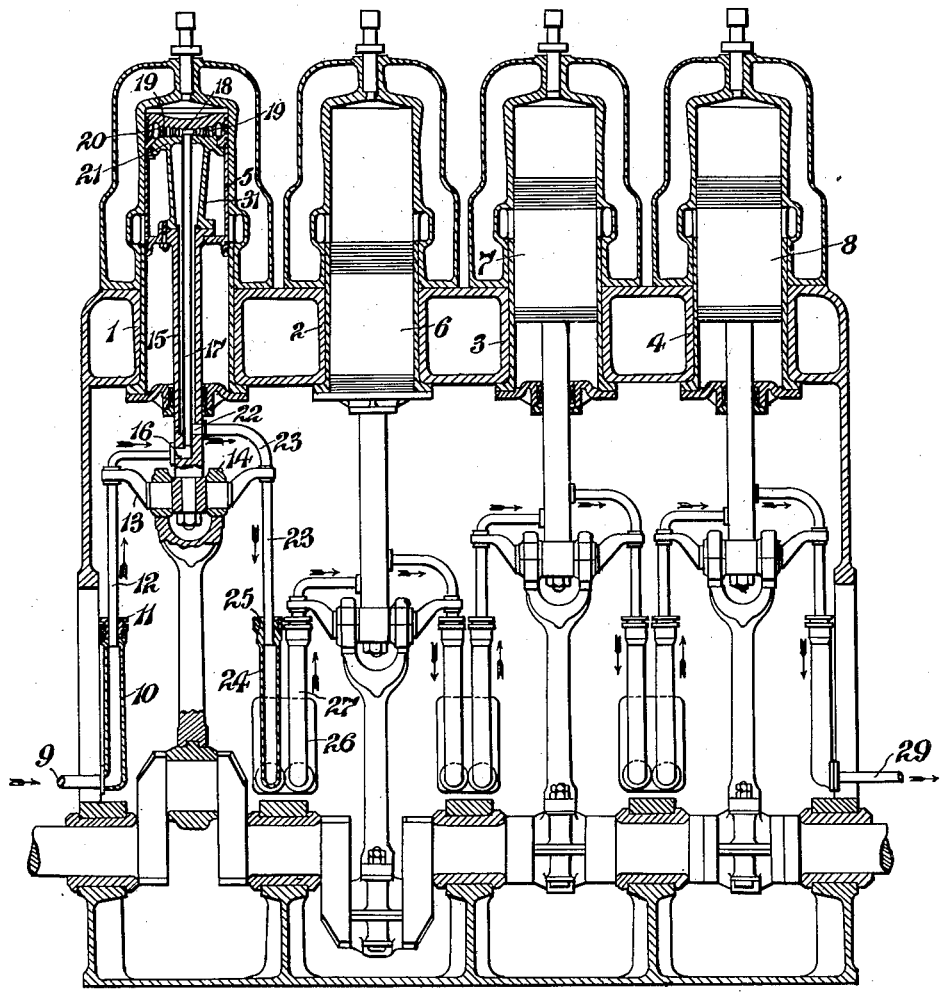

April 7, 1925. 1,532,915
O. MARGETSON ET AL
INTERNAL COMBUSTION ENGINE PISTON
Filed Aug. 23, 1921 2 Sheets-Sheet 2

Inventors;
Oliver Margetson
Walter Percy Widdowson
By J. Walter Fowler
Atty.

Patented Apr. 7, 1925.

1,532,915

UNITED STATES PATENT OFFICE.

OLIVER MARGETSON AND WALTER PERCY WIDDOWSON, OF LONDON, ENGLAND.

INTERNAL-COMBUSTION-ENGINE PISTON.

Application filed August 23, 1921. Serial No. 494,568.

(GRANTED UNDER THE PROVISIONS OF THE ACT OF MARCH 3, 1921, 41 STAT. L., 1313.)

*To all whom it may concern:*

Be it known that we, OLIVER MARGETSON and WALTER PERCY WIDDOWSON, subjects of the King of Great Britain, and residents of London, England, have invented certain new and useful Improvements in or Relating to Internal-Combustion-Engine Pistons (for which we have filed application in England May 14, 1920, Patent No. 168,596), of which the following is a specification.

This invention relates to the pistons of internal combustion engines and to methods of using the same, the pistons being of the type provided with means for cooling them.

The invention comprises a method of cooling the pistons of internal combustion engines by steam, wherein the steam is passed continuously through passages in hollow pistons, and it may then be used for heating, or expansively for power purposes in the same or another engine.

In a further feature of the invention as applied to multiple cylinder engines having hollow pistons or pistons provided with passages, the steam is passed through the pistons in series.

Heat may be abstracted from the steam during its passage from one piston to the next by means of any suitable interchanger or cooler such as a device for heating fuel oil.

In this invention a piston is so constructed that steam may be circulated through the body and head of the piston for the purpose of maintaining the metal of the piston especially that portion which forms part of the walls of the combustion chamber at a suitable working temperature. That is to say the steam is used to warm up the piston before starting the engine, and to cool the piston while the engine is running. The cooling effect on the piston is obtained by admitting the steam in a condition that will allow the steam to absorb heat from the metal of the piston. The heat absorbed by the steam evaporates the moisture suspended in the steam, and superheats the steam during its passage through the piston.

The piston is of the type having passages for the circulation of a cooling fluid, extending from the centre outwards, and having an inlet and outlet connected respectively to a suitable circulating system; these passages are, in accordance with my invention, arranged as concentric grooves formed between concentric ribs, so that if desired they can be turned out or machined in a lathe, the ribs being cut away at places to form a continuous passage for the steam from its central portion outwards.

In the preferred form of circulating system of cooling fluid the said inlet and outlet are connected respectively to concentric passages formed in the piston and connected through opposite sides of the cross-head to tubes adapted to move telescopically in larger fixed tubes provided with fluid tight glands, the fixed tube at one side of the cross-head being connected to a source of steam and that at the other to any suitable heat interchanger, or to pipes whereby the steam can be transmitted for use expansively as motive fluid for use in the same or another engine or cylinder.

The telescopic connections may be replaced by pipe connections having relatively movable parts or by an equivalent flexible device such as of the rocking tubular joint type.

The steam from the cooling system is superheated to an extent depending upon the amount of heat absorbed from it by the interchanger, and after being used expansively in one or more cylinders may exhaust into the other cylinder or cylinders of a multiple cylinder engine, as in compound engines.

Figure 5:
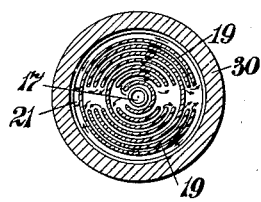
Figure 3:
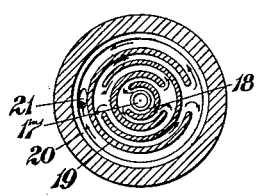
Figure 7:
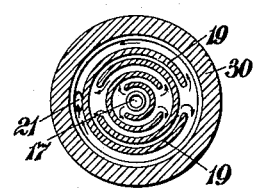
Figure 4:
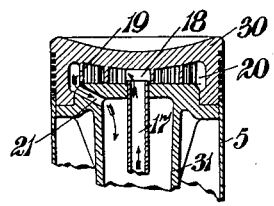
Figure 2:
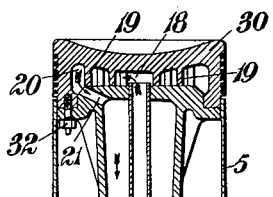
Figure 6:
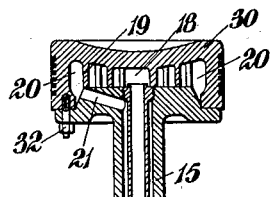

In the accompanying drawings, Figure 1 is a sectional elevation of an embodiment of the invention applied to a multiple cylinder engine, and Figure 2 is a sectional elevation and Figure 3 is a sectional plan of one form of piston made in accordance with the invention, Figure 4 is a sectional elevation and Figure 5 is a sectional plan of a modification of the piston shown in Figures 2 and 3, while Figure 6 is a sectional elevation and Figure 7 a sectional plan of a further modification of the piston shown in Figures 2 and 3.

Referring to Figure 1 of the accompanying drawings, the numerals 1 to 4 designate the cylinders of a multiple cylinder internal combustion engine, and the numerals 5 to 8 designate the pistons adapted to reciprocate within said cylinders.

Saturated steam is admitted to the pistons in series through an inlet pipe 9 into a tubular member 10 provided with a gland 11 in which reciprocates a tube 12 fixed on a bracket 13 secured to the cross-head 14 of the engine. The tube 12 after passing through the bracket 13 is bent towards a hollow piston rod 15 and secured thereto over an inlet 16. This inlet 16 conveys steam to a tube 17 secured in the bore of the piston rod and opening into the central space in the piston 5. Steam from the central space 18 of the piston 5 passes in the direction of the arrows between the concentrically arranged ribs 19 which are cut through at places as shown in Figures 3, 5 and 7, and finally reaches the outer groove 20 from which it passes through the opening 21 into the annular space between the bore of the piston rod and its central tube 17. The lower end of this annular passage communicates through an opening 22 with a tube 23 attached to the cross-head 14 in a similar manner to the tube 12 on its opposite side. The lower end of the tube 23 is adapted to slide in the tubular member 24 through a gland 25.

The tubular member 24 is connected to a heat interchanger 26, which may be a cooling device of any suitable construction such as a device for heating oil or water. Any suitable arrangement of tubing may be arranged in the interchanger 26, the ends of which are connected respectively to the tubular member 24 and a corresponding tubular member 27 which is coupled to the piston of the second cylinder of the series in the same manner as the tubular member 10 is connected to the piston 5 of the first cylinder, and so on with respect to the third and fourth cylinders of the engine, until the steam reaches the outlet 29 from which it is conveyed by suitable pipes to any suitable arrangement of steam distributing valve chests adapted to admit steam to the under side of the pistons. The steam passing through the outlet 29 will be superheated, and may be admitted to two or more of the cylinders in parallel.

The general details of the engine may be of any suitable construction.

An embodiment of the piston is shown in Fig. 2 in sectional elevation and in Fig. 3 in sectional plan, for use in a two stroke engine, being made of a considerable depth for the purpose, the corresponding parts to those on Fig. 1 are given the same numerals. The end or piston proper 30 is provided with a number of concentric ribs 19 which form between them concentric passages. The adjacent ribs are cut away at diametrically opposite points so that the steam will pass through the piston as indicated by the arrows from the central chamber 18 to the outer passage 20, from which it passes through the opening 21 as described above. The piston is provided with an inner member 31 turned to fit in a recess in the piston proper 30, its lower end resting on the concentric ribs 19 so as to close the concentric grooves between them. This inner member is flanged and secured to the piston proper 30 by studs and nuts 32, its outer end 33 is flanged and secured by studs and nuts 34 to a flange on the piston rod 15, the same studs being also used to secure the outer casing 5 of the piston 30 to its base portion.

Figs. 4 and 5 shown in partial sectional elevation and plan a piston having an alternative construction of ribs and grooves, the ribs being cut away in such a manner that the steam passes through adjacent grooves in parallel. In this example the ribs and passages are increased in number and are of a corresponding reduction in width, thereby giving an increased length of passage through which the steam passes.

An embodiment of the invention as applied to a piston for a four stroke engine is shown in Figs. 6 and 7, the corresponding parts being numbered as in the previous example. In this example the flange of the piston rod is secured in a recess in the piston in the same manner as the flange of the member 31 shown in Fig. 2 by bolts 32.

What we claim and desire to secure by Letters-Patent is:

1. The method of initially heating and subsequently cooling the pistons of internal combustion engines by steam, consisting in passing the steam continuously through passages in the pistons both when the engine is at rest, and throughout the entire cycle of its working.

2. The method of initially heating and subsequently cooling the pistons of a multiple cylinder internal combustion engine by steam, consisting in passing the steam continuously through passages in the pistons and passages connecting the pistons in series, both when the engine is at rest and throughout the entire cycle of its working.

3. The method of initially heating and subsequently cooling the pistons of internal combustion engines by steam, consisting in passing the steam continuously through passages in the pistons and passages connected thereto in series and containing heating apparatus, both when the engine is at rest and throughout the entire cycle of its working.

4. The method of initially heating and subsequently cooling the pistons of internal combustion engines by steam, consisting in passing the steam continuously through passages in the pistons and passages connected thereto in series and containing heat regulating apparatus, both when the engine is at rest and throughout the entire cycle of its working.

5. A multiple cylinder internal combustion engine comprising in combination a steam circulating system of pipes, piston passages, pipe connections having relatively movable parts, and heat interchangers, the pipe connections connecting the passages in the pistons in series during the running of the engine and when it is at rest, and the heat interchangers arranged in the system of piping between the pistons.

In witness whereof we affix our signatures.

OLIVER MARGETSON.
WALTER PERCY WIDDOWSON.